United States Patent [19]
Palmer

[11] 3,968,055
[45] July 6, 1976

[54] METHOD OF PREPARING CONDUCTIVE ROOM TEMPERATURE VULCANIZING MATERIAL

[75] Inventor: David Nelson Palmer, Tolland, Conn.

[73] Assignee: Combustion Engineering, Inc., Windsor, Conn.

[22] Filed: Oct. 25, 1974

[21] Appl. No.: 517,983

[52] U.S. Cl. .............................. 252/506; 252/511; 252/514; 252/519; 260/33.6 SB; 260/37 SB; 260/34.2
[51] Int. Cl.² ............................................ H01B 1/08
[58] Field of Search .................. 260/34.2, 33.6 SB; 252/506, 511, 514, 519

[56] References Cited
UNITED STATES PATENTS

| | | | |
|---|---|---|---|
| 3,303,163 | 2/1967 | Goossens ................. | 260/33.6 SB X |
| 3,547,834 | 12/1970 | Oshima et al. ...................... | 252/511 |
| 3,678,002 | 7/1972 | Nitzsche et al. ........... | 260/33.6 SB X |

*Primary Examiner*—Benjamin R. Padgett
*Assistant Examiner*—E. Suzanne Parr
*Attorney, Agent, or Firm*—Richard H. Berneike

[57] ABSTRACT

An RTV material is formed from either a vinylmethyl or polyphenyl siloxane matrix containing an iron oxide filler-binder a cross-linking agent and a finely divided, uniformly dispersed conductive metal powder. The conductive powder for use in radiation environments is either palladium or graphite and it is homogeneously dispersed by using a temporary dispersing agent. The material may be used to ultrasonically and electrically couple an ultrasonic transducer to a surface and it is stable under high temperature and radiation levels.

2 Claims, 1 Drawing Figure

U.S. Patent   July 6, 1976   3,968,055
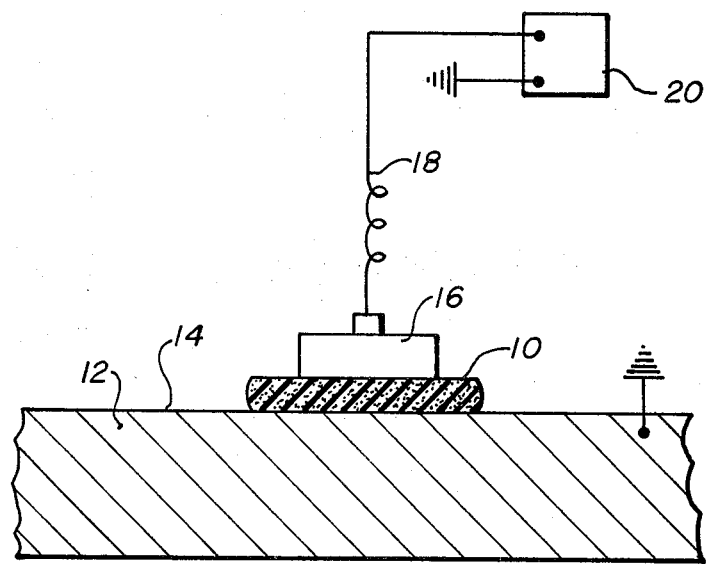

METHOD OF PREPARING CONDUCTIVE ROOM TEMPERATURE VULCANIZING MATERIAL

BACKGROUND OF THE INVENTION

The present invention relates to a method of preparing an electrically conductive room temperature vulcanizing material. It is frequently necessary to bond objects to surfaces with an electrically conductive bonding material in an environment in which the bonding material will be subject to high temperature and radiation levels. One example is the ultrasonic transducers which are used to monitor the vibration of a core barrel in a nuclear reactor. The bonding material in these situations may be subjected to temperatures as high as 600°F and radiation levels as high as 50R (Roentgen) per hour. Investigations have shown that conventional commercially available ultrasonic couplants are unsuitable for such conditions. For example, the commonly available colloidal grease type couplants will exhibit an excessive degree of thermal outgassing with eventual loss of physical properties and loss of mechanical bonding. Such changes would initially lead to constantly changing ultrasonic modulation which could generate erroneous ultrasonic data. Based on outgassing data, the in-service life of common high temperature couplants would be no greater than 700 hours at the temperatures encountered in nuclear reactor service. It is further estimated that under irradiation conditions, and with subsequent loss of adhesion and mechanical properties due to both the thermal and irradiation embrittlement, the useful service life of commercial couplants would be no greater than 50 hours. Because of this relatively short predicted service life, frequent changing of the couplant would be necessary. Radiation exposure levels as well as inaccessibility of the monitoring sites would make such a practice prohibitive.

One of the alternatives which has been considered to the use of colloidal grease type couplants is an alloy solder bonding system. A high temperature soldering system capable of withstanding 600°F and 50R per hour without altering the modulation characteristics of ultrasonic pulse systems is not available. Furthermore, in-field application of such systems is highly cumbersome and, therefore, objectionable.

Thermosetting resin systems have also been considered for use as ultrasonic couplants since they possess the highest bond strength to weight ratio. However, such a bond would require extensive physical alteration to the bonding surface for adhesion efficiency. In most cases, such systems would not withstand temperatures in excess of 450°F and would exhibit detectable monomer/cross-linking agent off-gassing for excessively long periods. Some of the thermosetting resin systems can be compounded to withstand temperature exposures approaching 600°F but they require long post cure cycles which cannot be handled in in-field applications.

A great many of the commercially available ultrasonic couplants are not electrically conductive and it is desirable in many situations, such as nuclear applications, that the couplant be conductive and serve as one of the electrical connections to the ultrasonic transducer. Some of these commercially available couplants can be rendered electrically conductive but the high conductive filler loads which are necessary greatly reduce the adhesion, the cross-linking efficiency and reduce the thermal stability.

SUMMARY OF THE INVENTION

An object of the present invention is to provide a method of preparing an electrically conductive room temperature vulcanizing bonding material which is stable when subjected to high temperature and radiation levels and which is conductive with a minimum loading of conductive particles. This is accomplished by using a room temperature vulcanizing material formed from either vinylmethyl siloxane or polyphenyl siloxane to which an iron oxide binder has been added to render the material temperature and radiation stable. The conductive property is provided by a novel process of dispersing radiation and temperature stable conductive particles homogeneously in the room temperature vulcanizing matrix through the use of a temporary dispersing agent, cyclohexane, which will not have an adverse effect on the properties of the matrix. The temporary dispersing agent is then removed to form a thixotropic paste. This paste is cured to a rubber like consistency and in turn is used as an adhesive.

BRIEF DESCRIPTION OF THE DRAWING

The drawing illustrates an ultrasonic transducer coupled to a surface with the material produced according to the present invention.

DESCRIPTION OF THE PREFERRED EMBODIMENT

Room temperature vulcanizing (RTV) elastomeric siloxane compositions are commercially available materials. There are many patents relating to such materials as well as other literature. Examples of some relevant U.S. Pat. Nos. are: 2,814,601; 3,070,566; and 3,294,739. The manner in which these basic siloxane compositions are formed is well-known to those skilled in the art. The two types of RTV elastomeric siloxanes which are applicable to the present invention are those formed from vinylmethyl siloxane and polyphenyl siloxane. Adhesives formed from these materials can be rendered temperature and radiation stable up to relatively high limits. This is accomplished by including small quantities of $FeO_x$ in the matrix as a binder. These elastomers are able to withstand extended exposure at 600°F with minimal changes in the physical properties and in fact there is mechanical property enhancement with continuous service at 600°F at high radiation levels. These materials have a low modulus of elasticity; they are inert and not subject to acid or alkaline attacks; they are non-corrosive to steels and they have excellent bond strength. Adhesives of this type are commercially available but they are not conductive.

There are two basic problems associated with the manufacture of conductive elastomeric adhesives for use in radiation environments. One of the problems is the selection of a suitable conductive agent and the other is the technique by which the conductive agent is dispersed into the siloxane matrix. Many of the materials which would normally be considered as a conductive material are unsuitable in radiation environments or in conjunction with the components of the elastomeric material. For example, silver, which is used for a conductive agent in commercially available cured silicone rubbers, has a high activation factor under the influence of radiation and the recoil energies of the activation by-products would cause premature damage to the elastomer. Platinum and gold form charge transfer complexes with the acetic anhydride used as the catalyst which would insulate these materials and cause them to act as nonconductors. Copper, aluminum, nickel and molybdenum will form passivated films in the presence of strong oxidizers such as the acetic anhydride also rendering them non-conductive. All of the above-noted conductive materials were evaluated along with graphite and palladium by forming a sandwich of the adhesives between carbon steel discs and then determining the resistance after curing. All of the above-noted materials which were evaluated with the exception of graphite and palladium had an infinite resistance. The average resistance of the sandwich containing the graphite conductor was 35 ohms for the particular sandwich while the resistance of the sandwich with the palladium conductors was 1.8 ohms. It has also been determined that the resistance of an adhesive containing a rhodium conductor would be comparable to the resistance of the palladium containing sandwich. Although each of these three materials is conductive and would be suitable in a radiation environment, the palladium is preferred because of its low resistivity as compared to graphite and its low cost as compared to rhodium. Alloys of palladium may also be used such as alloys containing cobalt, molybdenum or nickel.

A conductive elastomeric material has conductive particles located therein such that they are touching each other to form a conductive path. In order to obtain an effective conducting elastomeric material using only a reasonable amount of conductive agent, it is necessary to homogeneously disperse the conductive agent in the matrix. This is accomplished in the present invention by the use of a diluent or dispersing agent. Most of the diluents which are commercialy used for siloxane compositions, such as toluene or chloroform, are of the permanent type, i.e. they remain in the adhesives even after curing. However, such permanent diluents have been found to reduce the high temperature stability and be limited to at least 50°F below the undiluted temperature limit. Some of the commercial diluents will also permanently damage the elastomer matrix. The present invention employs a temporary diluent which really serves as a dispersing agent that is removed from the composition after mixing. Suitable dispersing agents are those cycloalkanes and cycloketones which can be removed from the composition either by vacuum evaporation or by heating to a relatively low temperature such that the matrix will not be damaged. The preferred dispersing agent is cyclohexane although other members of the cycloalkane series may be used such as cyclobutane, cyclopentane and cycloheptane. Cyclopentanone is an example of a dispersing agent which may be used from the cycloketone series.

In order to prepare an adhesive which will form a permanent bond, it is necessary to include within the composition a cross-linking catalyst. The preferred catalyst for the present invention is acetic anhydride. This catalyst can be premixed with the adhesive and stored under certain conditions as will be pointed out hereinafter for a considerable period of time without any cross-linking occurring. This is convenient since the adhesive can be fully mixed in one package and stored. Most of the other cross-linking catalysts which are used commercially cannot be premixed and stored, even under controlled conditions for very long and the only practical way they can be used is in a 2-part system in which the catalyst is packaged separate from the elastomer matrix. The catalyst is then added to the mixture just prior to use. Examples of such other catalysts, which can be used is the present invention but which are not preferred are dibutyl tin dilaurate and tin octoate.

The following formulation characterizes the present invention:

| COMPONENT | FUNCTION | PARTS BY WEIGHT |
| --- | --- | --- |
| Polyphenyl or vinyl-methyl siloxane polymer | Prepolymer Matrix | 100 |
| $Fe_2O_3$ | Filler-Binder | 10 to 25 |
| Acetic Anhydride | Catalyst Cross-linking Agent | 0.1 to 5.0 |
| Palladium Powder 325 Mesh | Conductive Agent | 50 to 100 |
| Cyclohexane | Dispersing Agent | 1000 to 1550 |

It should be noted that the amount of conductive agent is about one-third the amount normally found in commercial cured silicon rubbers. It is possible to use the small amount of conductive agent due to the technique of mixing the conductive agent with the matrix material as will be explained hereinafter.

In preparing the adhesive mixture, the siloxane polymer together with the filler-binder is dispersed in a first quantity of temporary dispersing agent while the conductive agent is dispersed in another quantity of the dispersing agent. These materials are then mixed and the dispersing agent is distilled off by low heat either with or without vacuum. This technique of separately dispersing the polymer and the conductive agent in the dispersing agent prior to mixing results in a homogeneous dispersion of the conductive agent in the elastomer matrix and is important for the development of the final desired property. The resultant thixotropic paste is transferred to a polyethylene bag and hermetically heat sealed. This prevents moisture from contacting the paste which would cause premature curing. When the paste is to be used, the bag is broken open and the paste applied to both surfaces. The surfaces must be free of impurities and preferably washed with acetone and air dried.

The drawing illustrates a transducer attached to a surface in accordance with the present invention. The member 12 with the surface 14 to which the transducer is to be applied may, for example, be the containment vessel for a nuclear reactor. The room temperature vulcanizing thixotropic paste 10 has been applied to the surface of the transducer 16 and to the surface 14 of the member 12 and the transducer applied to the surface. The room temperature vulcanizing material is then allowed to vulcanize through the action of the moisture in the air for the required period of time. The rear surface of the transducer 16 is connected through the lead 18 to the ultrasonic apparatus 20. The front surface of the transducer 16 is electrically connected to the member 12 by means of the conductive couplant 10. The grounding of the ultrasonic apparatus 20 and the member 12 completes the circuit to the transducer 16.

While specific formulations and particular uses for the present invention have been described, it is to be understood that these are by way of illustrations and that the invention is to be limited only by way of the claims as appended.

What is claimed is:

1. A method of preparing an electrically conductive room temperature vulcanizing material which is stable in the absence of moisture but which will cure open exposure to moisture which comprises the steps of:
   a. mixing in the absence of moisture (1) 100 parts by weight of a matrix material selected from the group consisting of vinylmethyl siloxane and polyphenyl siloxane, (2) from 10 to 25 parts by weight of an iron oxide filler-binder, (3) from 0.1 to 5.0 parts by weight catalyst cross-linking agent selected from the group consisting of acetic anhydride, dibutyl tin dilaurate and tin octoate to permit cross-linking of said matrix material upon exposure to moisture, and (4) a first quantity of a temporary dispersing agent selected from the group consisting of cyclohexane, cyclobutane, cyclopentane, cycloheptane and cyclopentanone;
   b. mixing from 50 to 100 parts by weight of a finely divided conductive material with a second quantity of said temporary dispersing agent, said conductive material being selected from the group consisting of palladium and graphite; the total of said first and second quantity of temporary dispersing agent being from 1000 to 1550 parts by weight;
   c. mixing in the absence of moisture said mixtures from steps a. and b.; and
   d. evaporating said temporary dispersing agent from said mixture whereby said conductive material is homogeneously dispersed in said room temperature vulcanizing material.

2. A method as recited in claim 1 wherein said step of evaporating said temporary dispersing agent comprises the step of heating said mixture.

* * * * *